United States Patent
Chiviendacz et al.

(10) Patent No.: US 8,612,757 B2
(45) Date of Patent: Dec. 17, 2013

(54) METHOD AND APPARATUS FOR SECURELY PROVIDING IDENTIFICATION INFORMATION USING TRANSLUCENT IDENTIFICATION MEMBER

(75) Inventors: Michael Chiviendacz, Ottawa (CA); Edward Pillman, Dallas, TX (US)

(73) Assignee: Entrust, Inc., Dallas, TX (US)

( * ) Notice: Subject to any disclaimer, the term of this patent is extended or adjusted under 35 U.S.C. 154(b) by 1267 days.

(21) Appl. No.: 10/748,523

(22) Filed: Dec. 30, 2003

(65) Prior Publication Data

US 2005/0149761 A1      Jul. 7, 2005

(51) Int. Cl.
   *H04L 9/32* (2006.01)
(52) U.S. Cl.
   USPC .................. 713/168; 340/5.6; 726/19
(58) Field of Classification Search
   USPC .......................................... 726/9, 19
   See application file for complete search history.

(56) References Cited

U.S. PATENT DOCUMENTS

| | | | | |
|---|---|---|---|---|
| 3,827,726 A * | 8/1974 | McVoy et al. | | 283/75 |
| 4,184,148 A | 1/1980 | Smagala-Romanoff | | |
| 4,189,353 A | 2/1980 | Harriman | | |
| 4,445,712 A | 5/1984 | Smagala-Romanoff | | |
| 4,795,890 A | 1/1989 | Goldman | | |
| 4,921,278 A | 5/1990 | Shiang et al. | | |
| 4,936,778 A | 6/1990 | Setchell et al. | | |
| 5,233,436 A * | 8/1993 | Oksman et al. | | 386/46 |
| 5,246,375 A * | 9/1993 | Goede | | 434/236 |
| 5,251,259 A | 10/1993 | Mosley | | |
| 5,347,580 A | 9/1994 | Molva et al. | | |
| 5,381,539 A | 1/1995 | Yanai et al. | | |
| 5,491,752 A | 2/1996 | Kaufman et al. | | |
| 5,537,571 A | 7/1996 | Deville | | |
| 5,552,845 A * | 9/1996 | Nagao et al. | | 396/380 |
| 3,719,801 A | 1/1998 | Drexler | | |
| 5,712,627 A * | 1/1998 | Watts | | 340/5.81 |
| 6,230,169 B1 * | 5/2001 | Nagae | | 715/512 |
| 6,246,769 B1 | 6/2001 | Kohut | | |

(Continued)

FOREIGN PATENT DOCUMENTS

| | | |
|---|---|---|
| CA | 2193819 C | 1/1996 |
| EP | 1176489 A1 | 1/2002 |

(Continued)

OTHER PUBLICATIONS

The Anti-Phishing Working Group; Proposed Solutions to Address the Threat of Email Spoofing Scams; Dec. 2003; pp. 1-10.

(Continued)

*Primary Examiner* — Fikremariam A Yalew
(74) *Attorney, Agent, or Firm* — Faegre Baker Daniels LLP

(57) ABSTRACT

An apparatus and method for securely providing identification information generates one or more obscured identifiers for a recipient, such as one or more identifiers that are generated based on data unique to a recipient or other information as may be appropriate. In one embodiment, the method and apparatus generates a translucent identification member, such as a plastic card, sheet, film or other suitable member that has a translucent area that includes one or more obscured identifiers. When the translucent identification member is overlayed on a screen displaying a visual filtering pattern, one of one or more obscured identifiers is visually revealed for use during the particular transaction. The revealed identifier is entered into a recipient device and sent to an authenticator to be verified as an appropriate identifier for the transaction.

44 Claims, 15 Drawing Sheets

(56) References Cited

U.S. PATENT DOCUMENTS

| | | | |
|---|---|---|---|
| 6,438,550 | B1 | 8/2002 | Doyle et al. |
| 6,732,277 | B1 | 5/2004 | Vandergeest et al. |
| 6,772,336 | B1 | 8/2004 | Dixon, Jr. |
| 6,784,905 | B2 * | 8/2004 | Brown et al. ................. 715/865 |
| 6,934,838 | B1 | 8/2005 | Boyce et al. |
| 6,950,949 | B1 | 9/2005 | Gilchrist |
| 6,970,827 | B2 | 11/2005 | Zeltzer et al. |
| 6,975,727 | B1 | 12/2005 | Vandergeest |
| 6,980,081 | B2 | 12/2005 | Anderson |
| 7,100,049 | B2 | 8/2006 | Gasparini et al. |
| 2002/0010684 | A1 | 1/2002 | Moskowitz |
| 2002/0078350 | A1 | 6/2002 | Sandhu et al. |
| 2002/0081179 | A1 | 6/2002 | Vallstrom |
| 2002/0091938 | A1 | 7/2002 | Hiltunen et al. |
| 2003/0009670 | A1 | 1/2003 | Rhoads |
| 2003/0015866 | A1 * | 1/2003 | Cioffi et al. ................. 283/72 |
| 2003/0028786 | A1 | 2/2003 | Mustafa |
| 2003/0141373 | A1 | 7/2003 | Lasch et al. |
| 2003/0154286 | A1 * | 8/2003 | Tang et al. ................. 709/227 |
| 2003/0154406 | A1 | 8/2003 | Honarvar et al. |
| 2003/0204743 | A1 | 10/2003 | Devadas et al. |
| 2003/0210127 | A1 | 11/2003 | Anderson et al. |
| 2003/0233546 | A1 | 12/2003 | Blom |
| 2004/0054863 | A1 | 3/2004 | Harada et al. |
| 2004/0078571 | A1 | 4/2004 | Haverinen |
| 2004/0093372 | A1 | 5/2004 | Chen et al. |
| 2004/0122960 | A1 | 6/2004 | Hall et al. |
| 2004/0187018 | A1 | 9/2004 | Owen et al. |
| 2004/0190718 | A1 | 9/2004 | Dacosta |
| 2004/0193910 | A1 * | 9/2004 | Moles ................. 713/200 |
| 2004/0223619 | A1 | 11/2004 | Jablon |
| 2005/0033688 | A1 | 2/2005 | Peart et al. |
| 2005/0050328 | A1 | 3/2005 | Mizrah |
| 2005/0050330 | A1 | 3/2005 | Agam et al. |
| 2005/0097320 | A1 | 5/2005 | Golan |
| 2005/0144449 | A1 | 6/2005 | Voice |
| 2005/0144451 | A1 | 6/2005 | Voice et al. |
| 2005/0177716 | A1 * | 8/2005 | Ginter et al. ................. 713/157 |
| 2006/0015725 | A1 | 1/2006 | Smith et al. |
| 2006/0156385 | A1 | 7/2006 | Chiviendacz et al. |
| 2007/0005967 | A1 | 1/2007 | Mister et al. |
| 2007/0015490 | A1 | 1/2007 | Munje et al. |
| 2008/0109899 | A1 | 5/2008 | Rijnswou |
| 2008/0301371 | A1 | 12/2008 | Peled et al. |

FOREIGN PATENT DOCUMENTS

| | | |
|---|---|---|
| FR | 2654238 | 5/1991 |
| WO | WO 99/24267 | 5/1999 |
| WO | 0208974 | 1/2002 |
| WO | 02/17556 | 2/2002 |

OTHER PUBLICATIONS

America's Growth Capital; Authenticated Email Primer: Tumbleweed Jumps Into the Fray; Apr. 8, 2004; pp. 1-13.
The Dryad Numeral Cipherauthentication System; from https://hosta.atsc.eustis.army.mil; printed May 11, 2004; pp. 1-12.
PassMark; What are PassMarks?; from www.passmarksecurity.com; printed Apr. 21, 2005; p. 1.
European Patent Office International Search Report for International Application No. PCT/IB2004/002234 dated Jan. 24, 2005.
European Patent Office Written Opinion for International Application No. PCT/IB2004/002234 dated Jan. 24, 2005.
Canadian Intellectual Property Office International Search Report for International Application No. PCT/CA2005/000067 dated Jul. 18, 2005.
Canadian Patent Office International Search Report for International Application No. PCT/CA2006/002017 dated Mar. 30, 2007.
Canadian Patent Office International Search Report for International Patent Application No. PCT/CA2004/002091 dated Mar. 21, 2005.
Canadian Patent Office International Search Report for International Application No. PCT/CA2006/001562 dated Dec. 15, 2006.
"RSA SecurID for Microsoft Windows," RSA Security, Inc. Brochure No. SIDMS DS0504.
Supplementary EP Search Report; EP Application No. 04802268.5; dated Aug. 4, 2010.
Tech FAQ "What is two Factor Authentication?"; pp. 1-2; Mar. 13, 2005 (Internet Archive Wayback Machine).
PFBlog "Why Do Credit Cards Expire?"; Feb. 7, 2005; p. 1; www.pfblog.com/archives/1560_why_do_credit_cards_expire.html.
Engineering Statistics Handbook, "Histogram"; Jun. 2004; pp. 1-3; http://www.itl.nist.gov/div898/handbook/eda/section3/histogra.html.
Microsoft, "Account Lockout Best Practices Whitepaper"; May 20, 2004; pp. 1-52.
SearchSecurity "TwoFactor Authentication"; Jun. 19, 2004; http://searchsecurity.techtarget.com/sDefinition/0,,sid14_gci992919,00.html.
Chinese Office Action; Chinese Application No. 200510121789.7; dated Sep. 25, 2009.
Australian Office Action; Australian Application No. 2004319571; dated Mar. 13, 2009.
Chinese Office Action; Chinese Application No. 200480043373.1; dated Mar. 27, 2009.
Australian Office Action; Australian Application No. 2005297350; dated Jun. 1, 2009.
Supplementary EP Search Report; EP Application No. 05706404.0; dated Nov. 5, 2007.

* cited by examiner

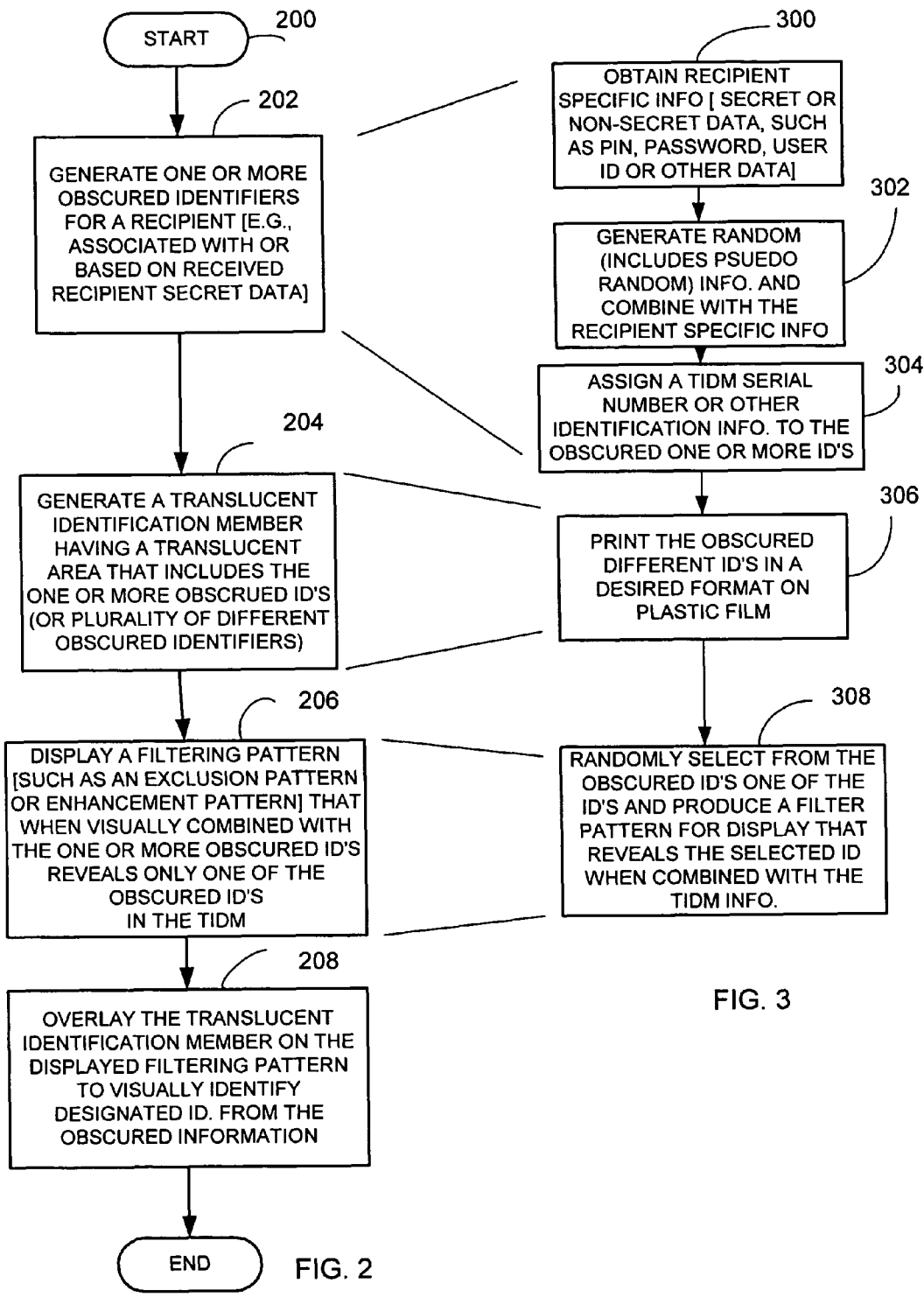

METHOD AND APPARATUS FOR SECURELY PROVIDING IDENTIFICATION INFORMATION USING TRANSLUCENT IDENTIFICATION MEMBER

FIELD OF THE INVENTION

The invention relates generally to methods and apparatus for authenticating users or other entities or for securely providing identification information, and more particularly to methods and apparatus that securely provide identification information such as part of a multi-factor authentication scheme.

BACKGROUND OF THE INVENTION

Information security and user identification security are becoming increasingly important as technology becomes more sophisticated. For example, multi-factor authentication schemes are used in an attempt to thwart hackers or to thwart other inappropriate uses of information and user identities. For example, a two factor authentication scheme may use information known to a recipient or user such as a password or personal identification number (PIN) as well as some type of physical token such as a banking card, credit card, password token or other physical token which a user must be in physical possession of in order to initiate and complete an on-line transaction. Another level of authentication may include biometric authentication that may include the scanning of a fingerprint, eye or other biometric to again verify that the user attempting to gain access to a process, device, application or other right is in fact the appropriate user.

Transaction cards are known that may include for example smart cards, magnetic strip-based cards, and other transaction cards that facilitate banking transactions, credit card transactions, or any other suitable transactions. As known in the art, a user personal identification number (PIN) is usually required in addition to the possession of a banking card to obtain cash from a cash-dispensing machine or to otherwise carry out an online transaction. One known multi-factor authentication technique employs the use of a hardware token such as a battery operated smart card that displays a periodically changing and seemingly random number on a portion of the smart card. When a user wishes to execute a transaction with the smart card, for example, the user enters the seemingly random number that changes often. The receiving transaction server compares the received code entered by the user as displayed on the smart card with a corresponding number generated by a code source generator. If the code entered by the user matches the number generated by the code source generator, the transaction is approved and the user is granted a particular right such as accessing a bank account, purchasing goods, obtaining information, gaining access to a website or other software application, or any other suitable right as desired. However, such hardware tokens can be quite expensive and are battery powered thereby requiring changing of the battery and the potential of an electronic malfunction due to moisture problems or any other problems related to electronic circuitry.

Other smart cards that do not employ such screens typically require a card reader that reads, for example, a magnetic strip. This can be a restriction where a user wishes to perform an online transaction but is not sitting at a terminal that contains or has access to a magnetic strip reader.

In an apparently unrelated field, translucent cards are known such as plastic cards that contain a semi-transparent picture or pattern that when visually evaluated does not appear to connote any particular information. However, when the translucent card is held over a display with a corresponding background filter pattern, the combination of the pattern on the card with the background pattern on the display screen combine to present a visually recognizable message or word such as the word "sorry" or "you're a winner". These are static messages which are not unique to any user and typically include only a single message. Such plastic cards may be used for example to see if a holder has won a prize. The card for example may be mailed in the mail to members of a population. Those recipients then go to a web page identified on the translucent card or otherwise indicated in the mailing information to see if they have won a prize. However, such plastic cards do not provide multi-factor authentication, are not user specific, do not include multiple messages and typically include static messages.

Accordingly, a need exists for a method and apparatus for securely providing identification information that overcomes one or more of the above problems.

DETAILED DESCRIPTION OF THE DRAWINGS

FIG. 2 is flow chart illustrating one example of a method for securely providing identification information in accordance with one embodiment of the invention;

FIG. 3 is a diagram illustrating a further break down of the method shown in FIG. 2;

Figure 6:
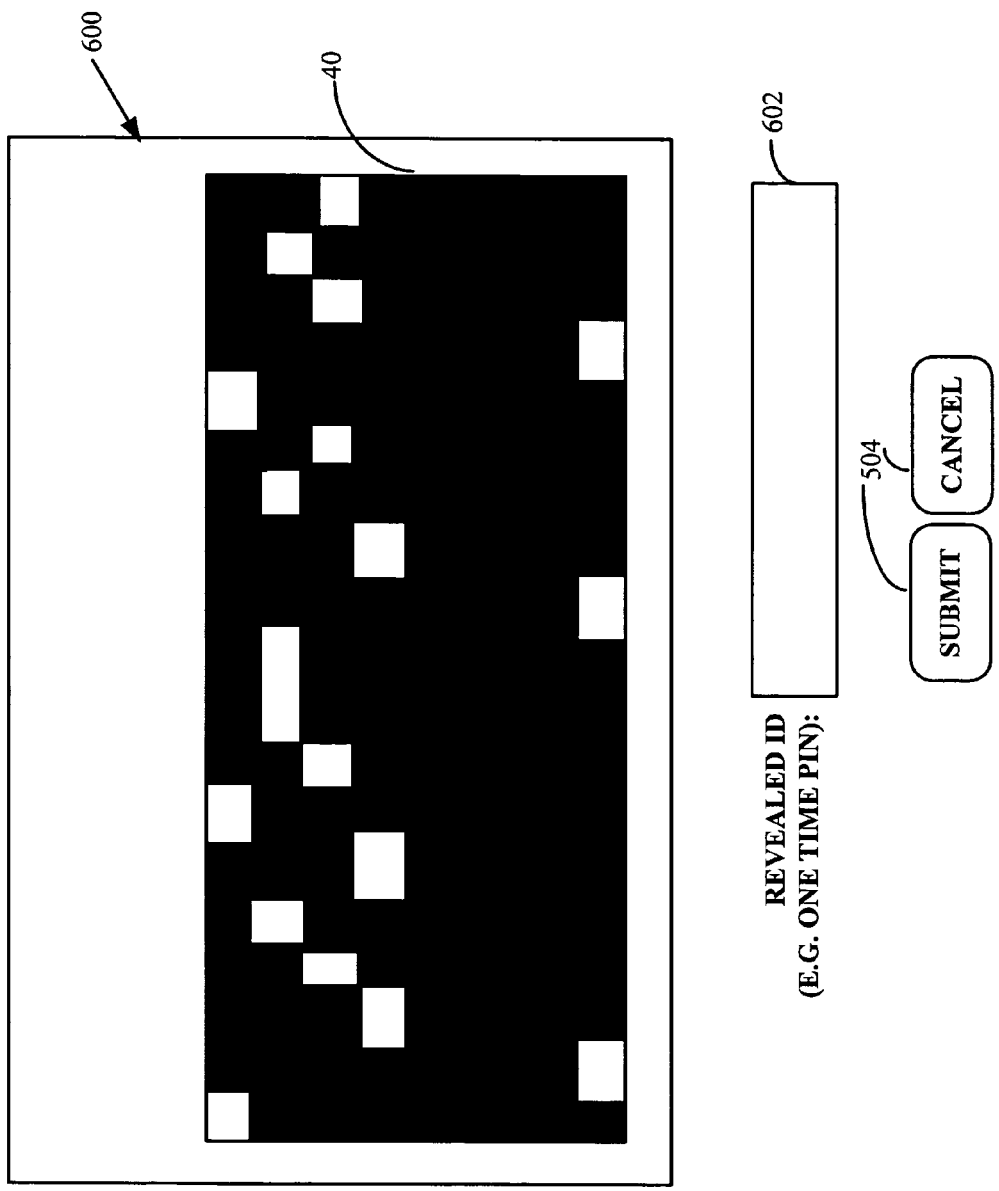
Figure 7:
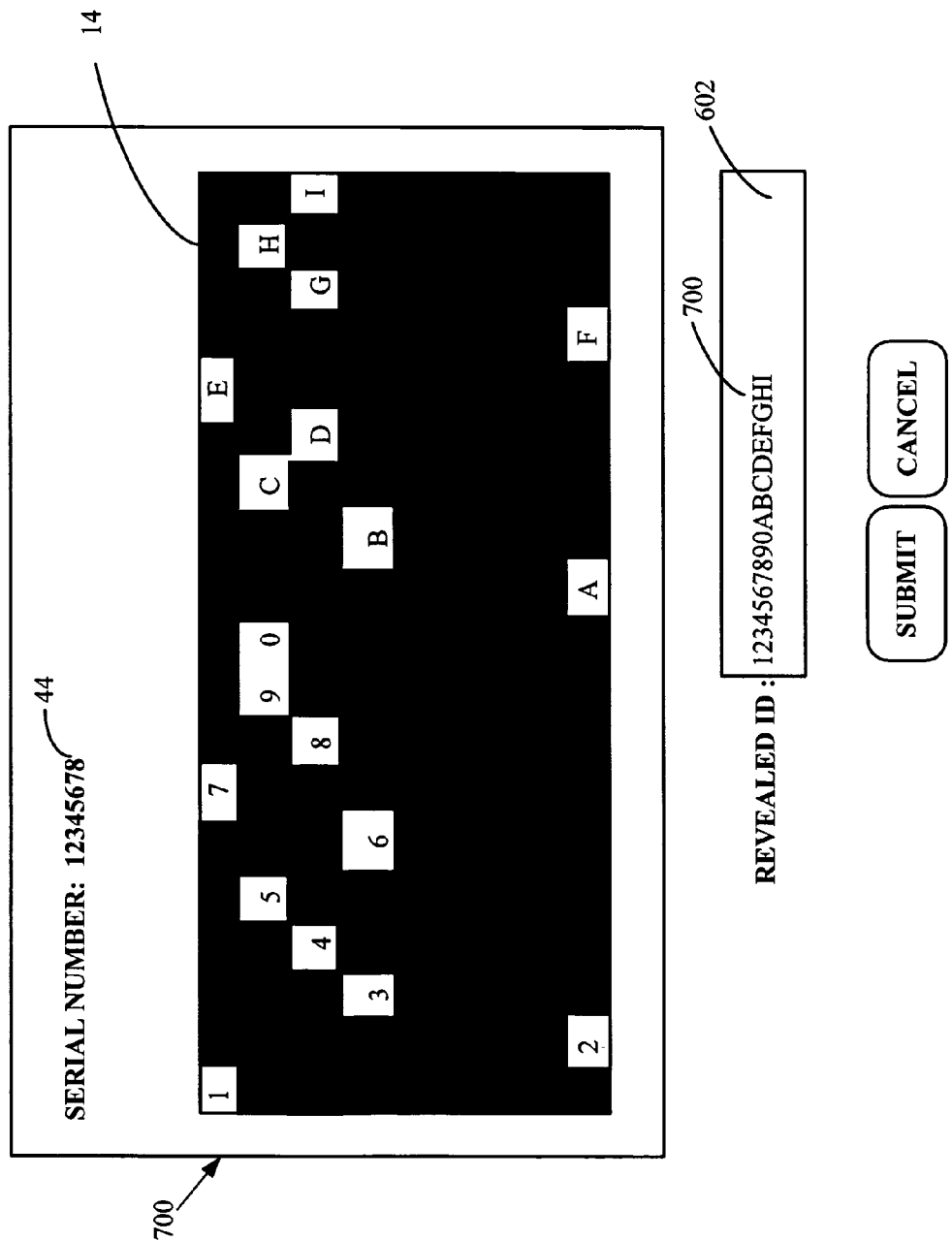
Figure 8:
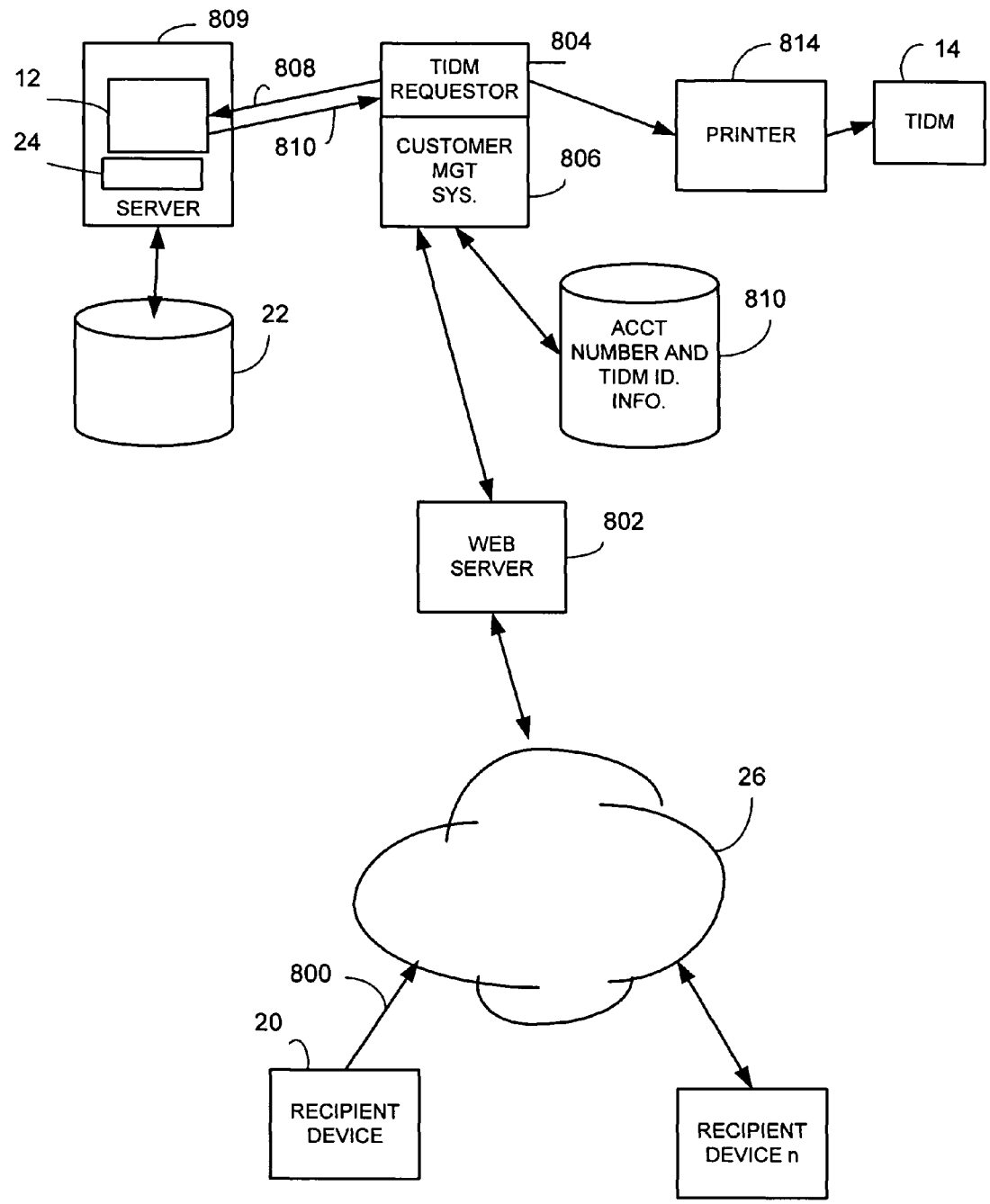
Figure 9:
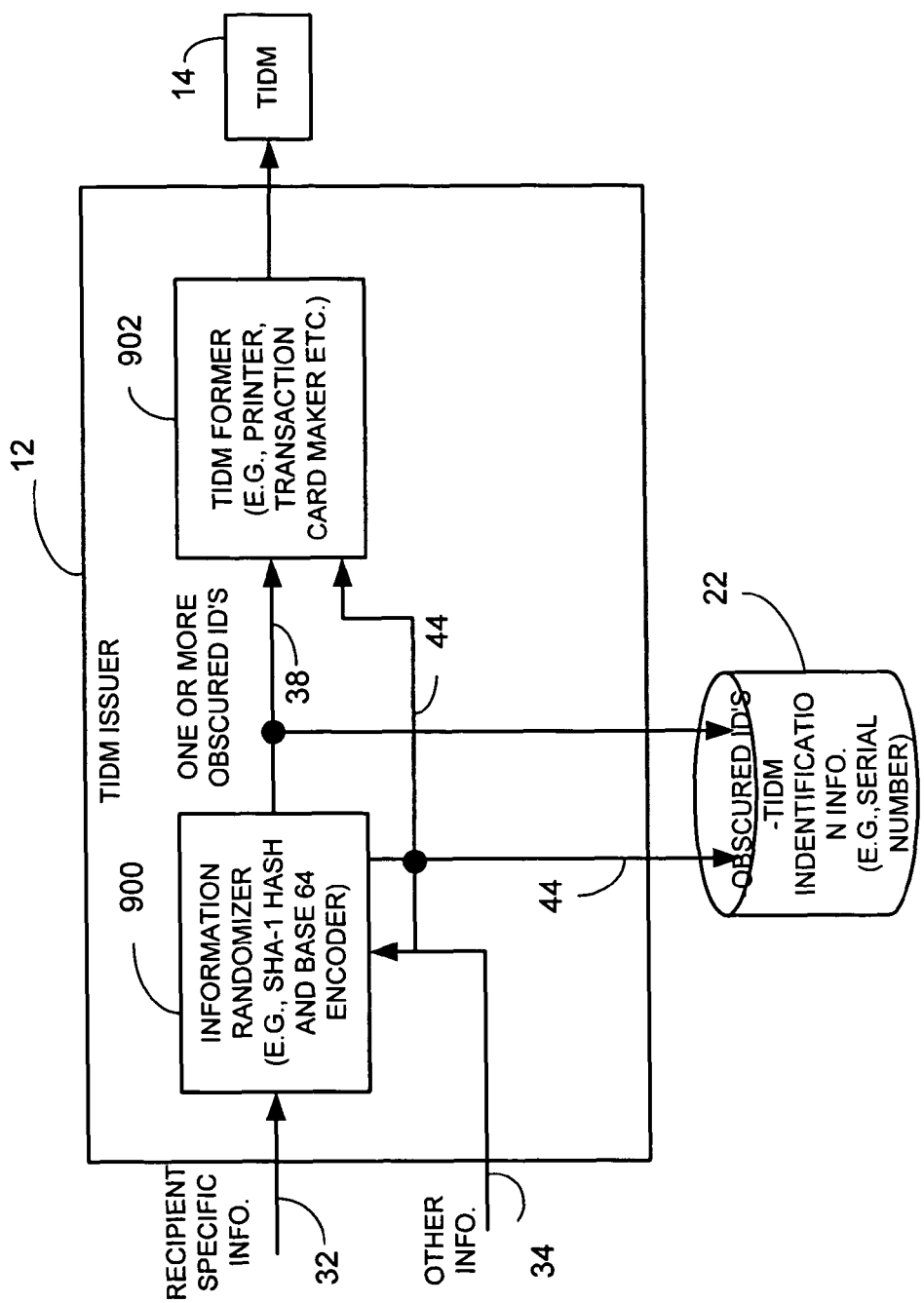
Figure 10:
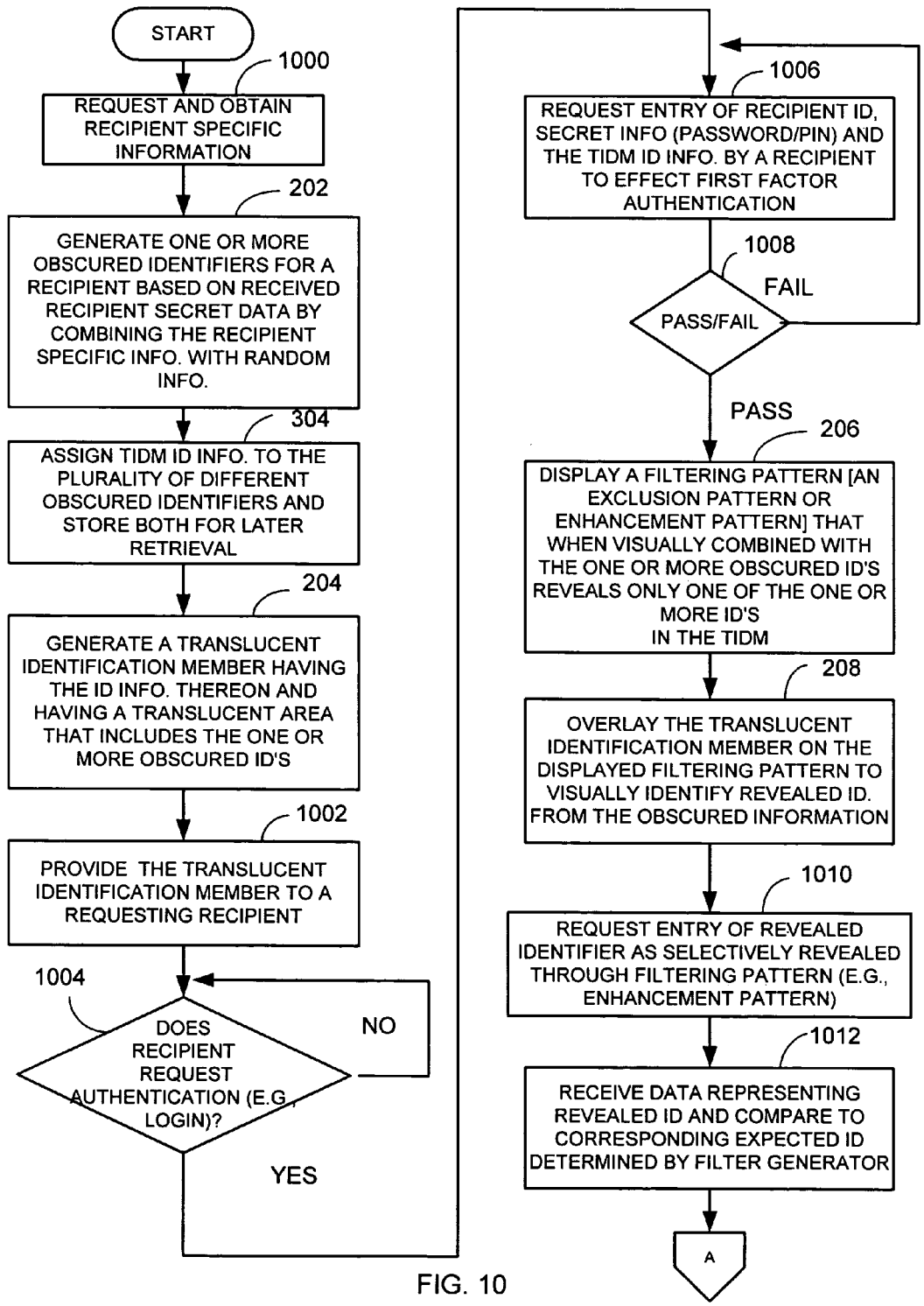
Figure 11:
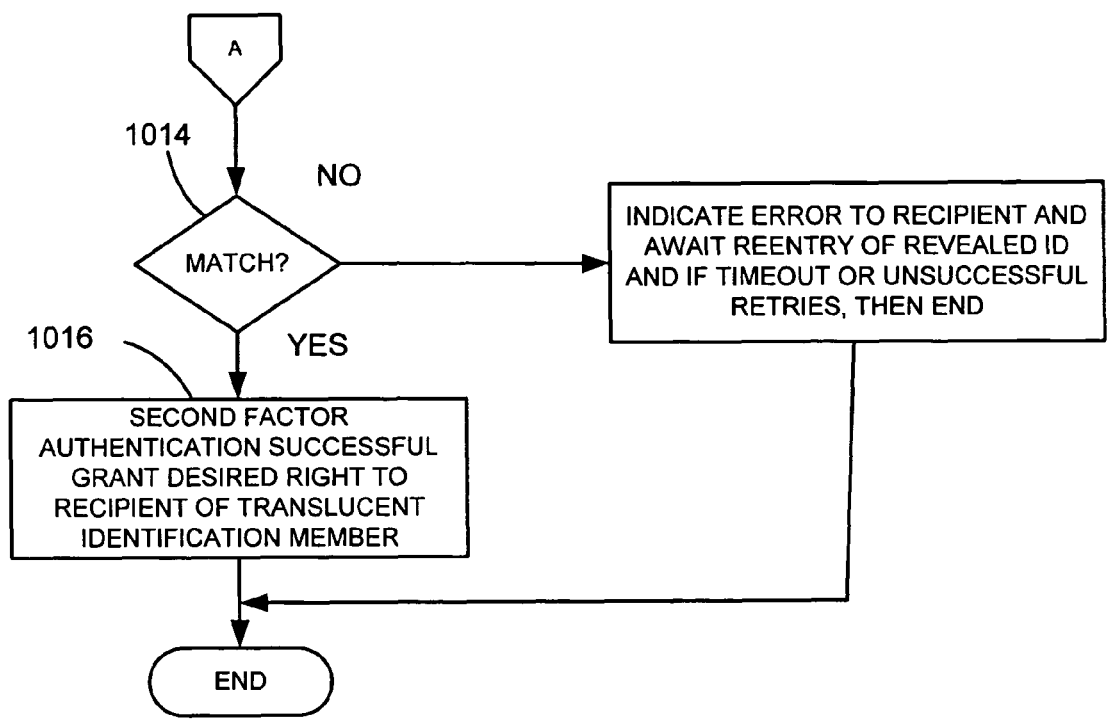
Figure 12:
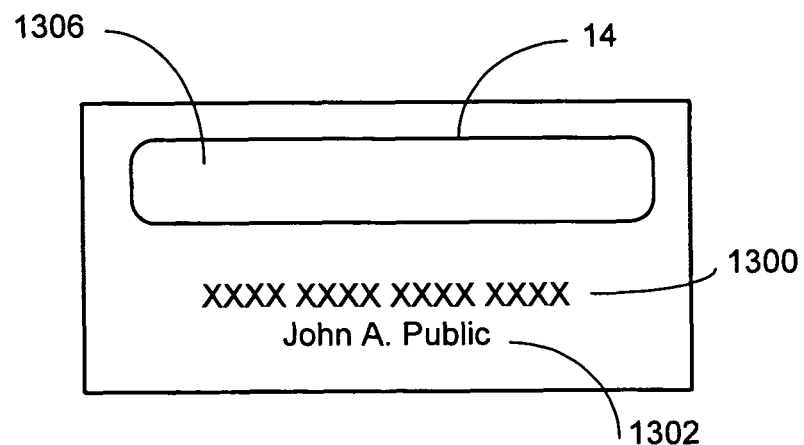
Figure 13:
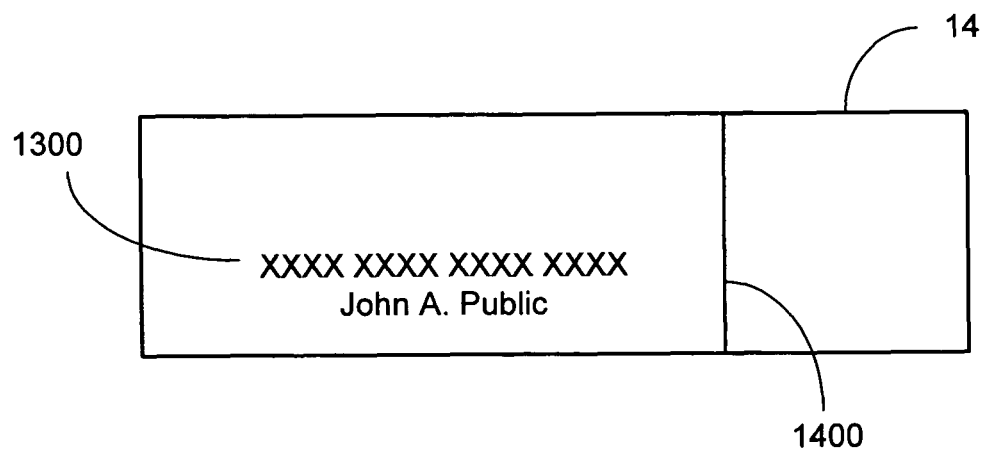
Figure 14:
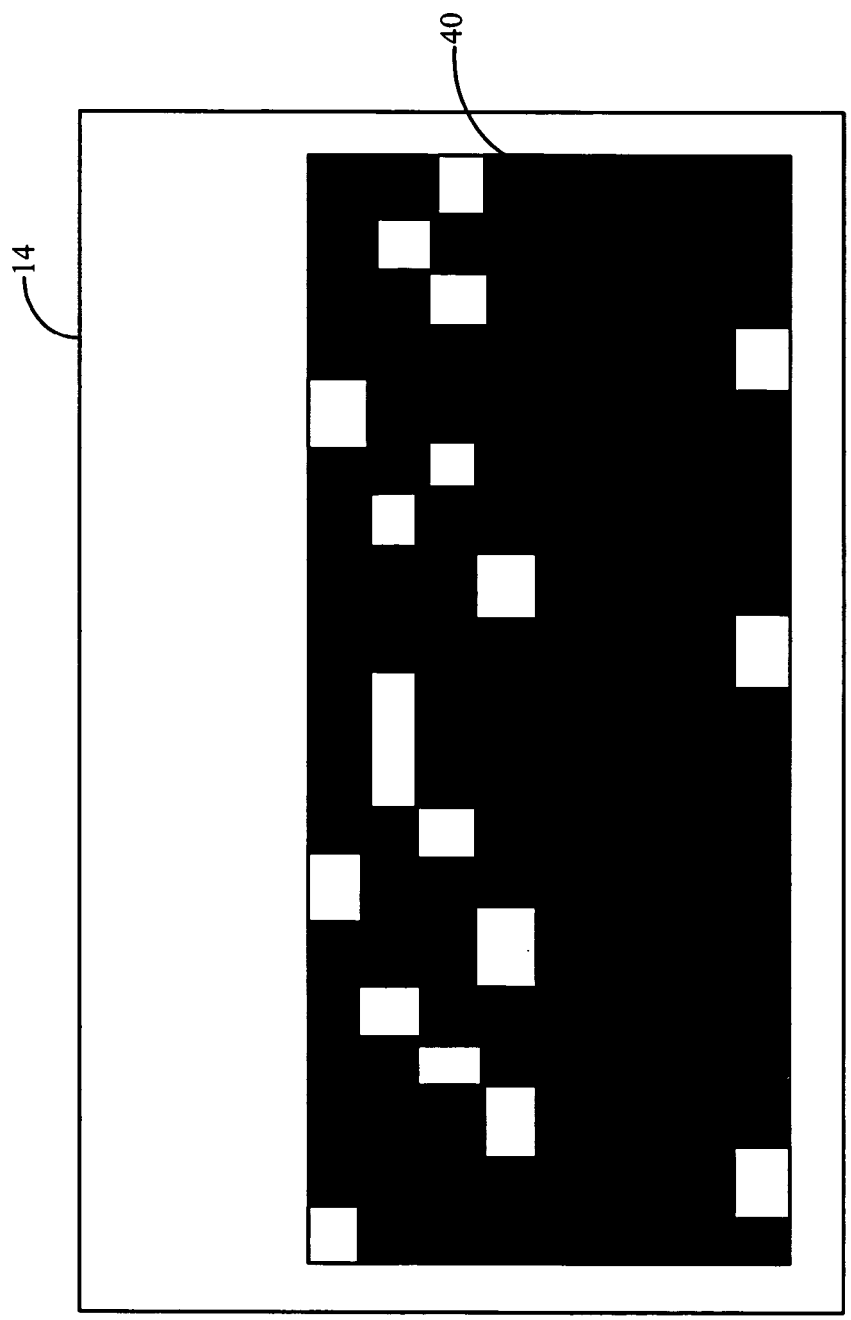
Figure 15:
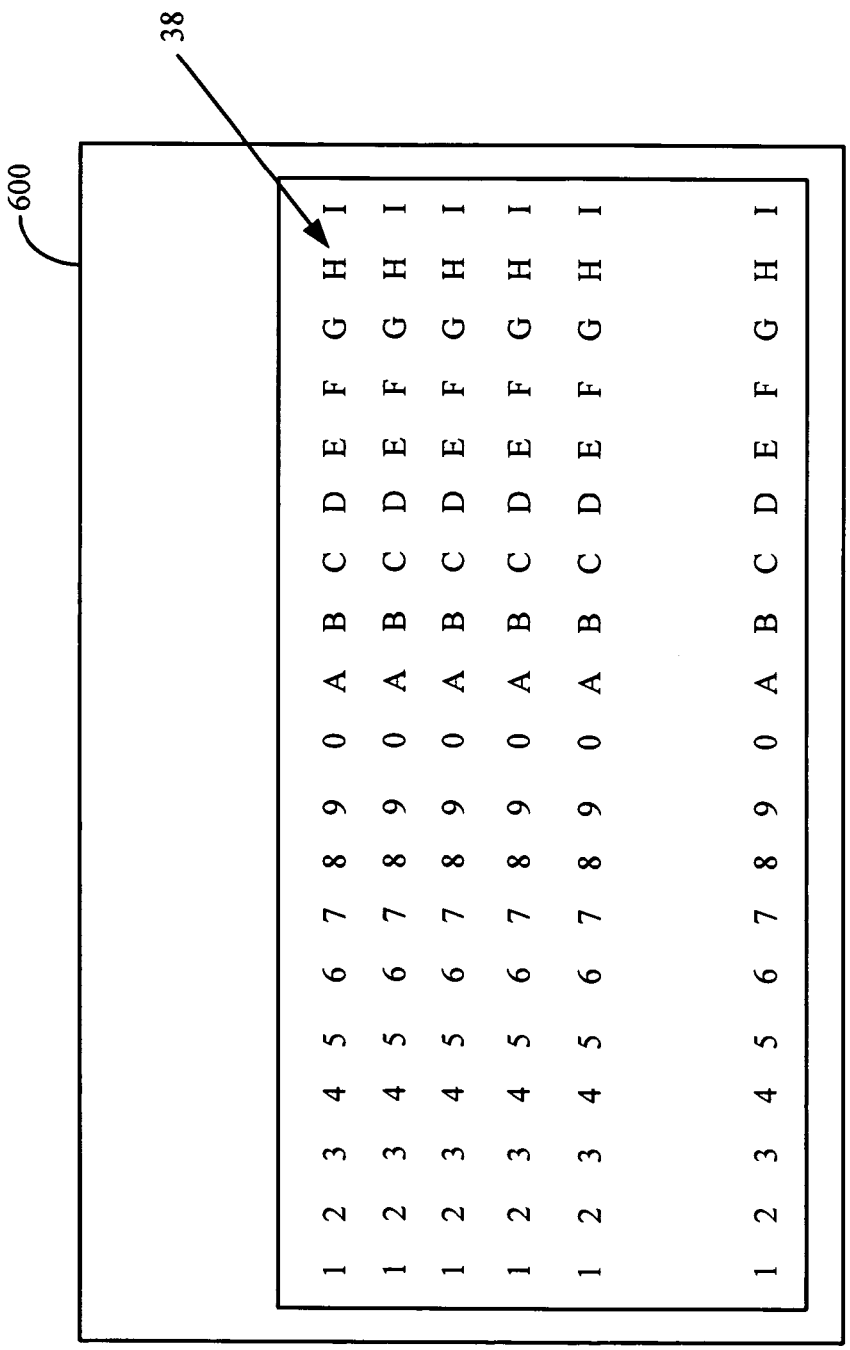
Figure 16:
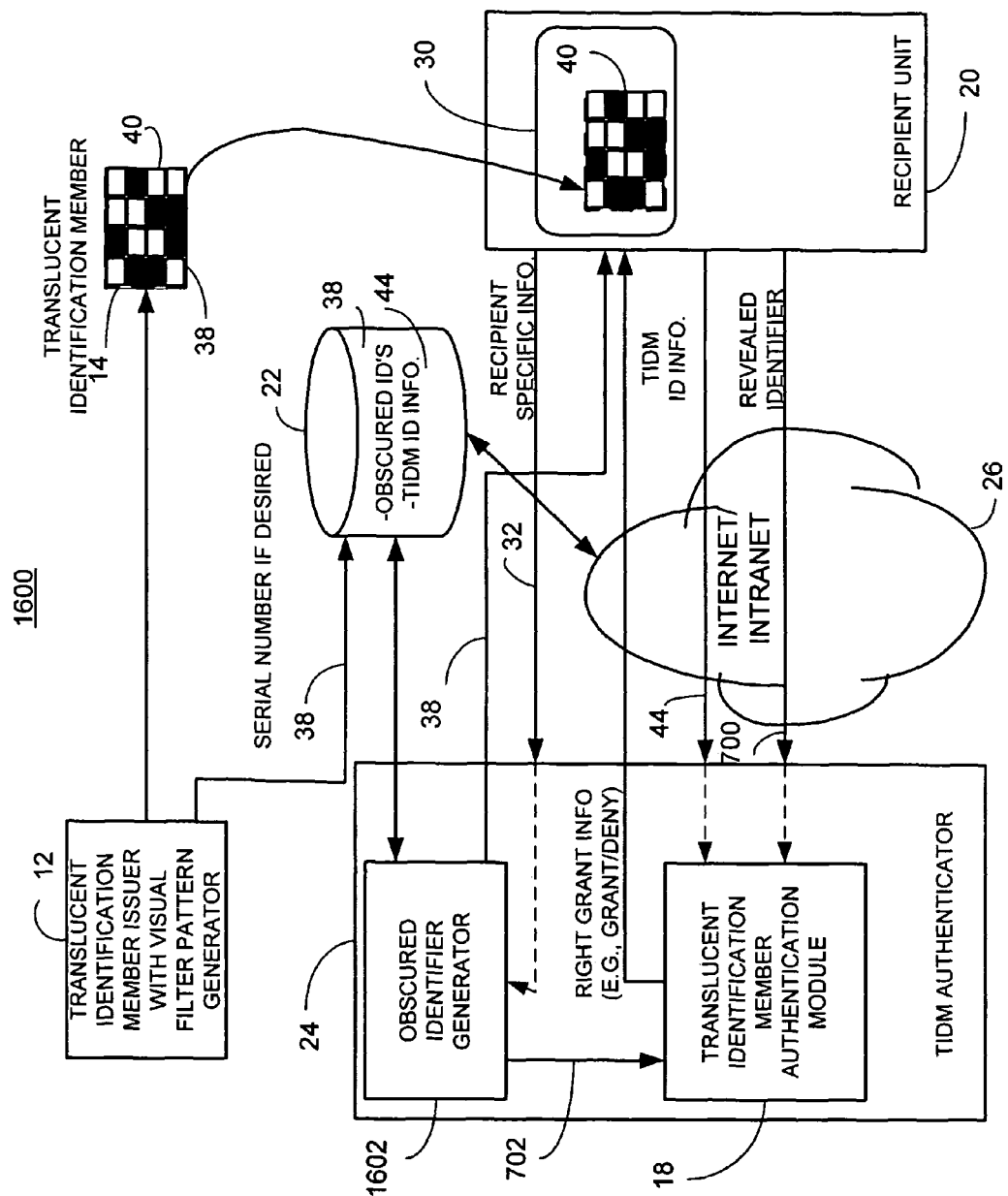
Figure 17:
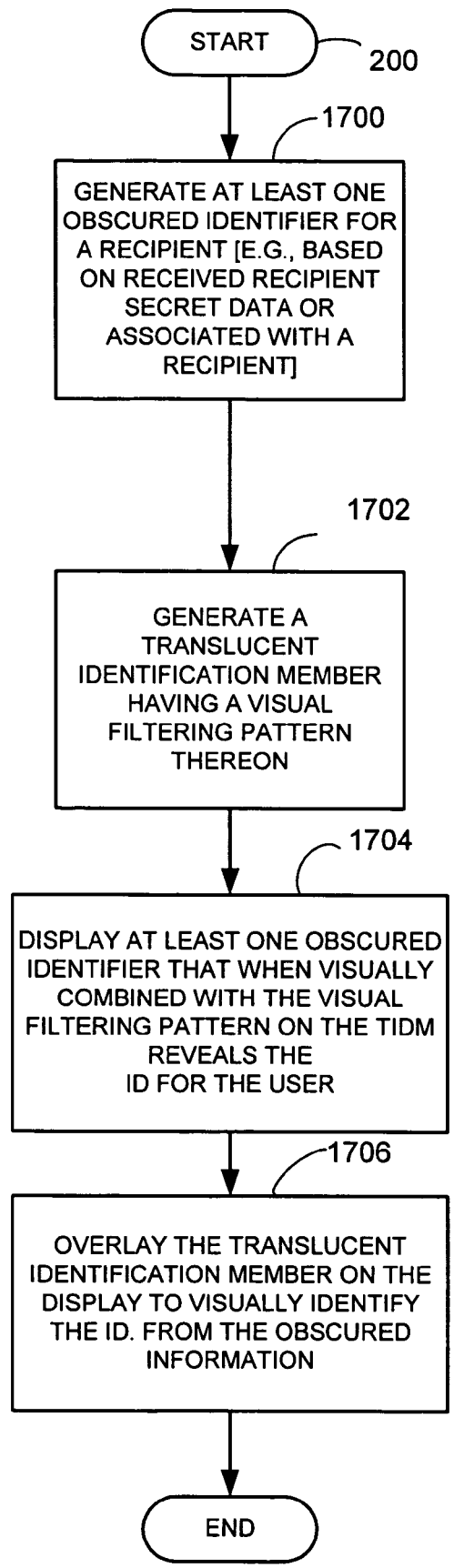

FIG. 6 diagrammatically illustrates one example of a displayed visual filtering pattern in accordance with one embodiment of the invention;

FIG. 7 graphically illustrates one example of a visually identified designated identifier from one or more obscured identifiers that are located on a translucent identification member in accordance with one embodiment of the invention;

FIG. 8 is a diagram of a system for securely providing identification information in accordance with one embodiment of the invention;

FIG. 9 is a block diagram illustrating in more detail one example of a translucent identification member issuer in accordance with one embodiment of the invention;

FIGS. 10 and 11 illustrate a flowchart showing one example of a method for securely providing identification information in accordance with one embodiment of the invention;

FIG. 12 illustrates one example of a transaction card including a portion containing a translucent identification member in accordance with one embodiment of the invention;

FIG. 13 illustrates another example of a transaction card that contains a translucent identification member in accordance with one embodiment of the invention;

FIG. 14 is a diagram illustrating one example of a secure identification information member in accordance with another embodiment of the invention;

FIG. 15 diagrammatically illustrates one example of displayed obscured identifier information in accordance with one embodiment to the invention;

FIG. 16 is a block diagram illustrating another example of a system for securely providing identification information in accordance with one embodiment to the invention; and FIG. 17 is a flow chart illustrating one example of a method for securely providing identification information in accordance with one embodiment to the invention.

DETAILED DESCRIPTION OF A PREFERRED EMBODIMENT OF THE INVENTION

Briefly, in one embodiment, an apparatus and method for securely providing identification information generates one or more obscured user (e.g., recipient) identifiers for a recipient, such as a plurality of identifiers that are generated based on user secret data such as a password, personal identification number or other secret or non-secret information or identifiers that are not based on user secret data, such as the identifier being randomly generated and then associated with the user. In this case, no user-related information is used, but the identifier can still identify the user. In another embodiment, a single obscured identifier may be used.

In one embodiment, the method and apparatus generates a translucent identification member (TIDM), such as a portion of, or an entire, plastic card, sheet, film, or other suitable member that has a translucent area that includes the one or more obscured identifiers. As used herein, translucent area can also include a transparent area. For example, the translucent identification member may be made from transparent or clear sheets, including smoked plastic or other suitable coloring with the obscured identifiers (including non-character information) printed in ink or otherwise placed thereon or therein. The one or more obscured identifiers may be for example one-time authentication identifiers that are unique to a recipient of the translucent identification member. As such, the translucent identification member or card contains what appears to visually be a random pattern of information.

A corresponding visual filtering pattern is also generated for display on a display device when the user desires to use the translucent identification member. For example, the visual filtering pattern also appears to be random from a visual point of view but when visually combined with the one or more obscured identifiers on the translucent identification member, a designated one of the one or more obscured identifiers is visually revealed. In one embodiment, a user may overlay the translucent identification member over a designated portion of a display device or in the designated portion of a display that displays the visual filtering pattern. A combination of the visual filtering pattern with the pattern of different obscured identifiers on the translucent identification member combine to form a visually revealed single identifier or message from the one or more identifiers. Hence, for example in one embodiment, a seemingly random pattern is generated on a screen which helps ensure only a single identifier is exposed visually to a user that is viewing the translucent identification member which is overlayed on the visual filtering pattern that is being displayed on the display.

Accordingly, if desired, a security officer that has access, for example, to a translucent identification member issuer may use a package of blank cellophane cards that may be used to make the translucent identification members on a local printer. The translucent identification members may be printed having translucent color pattern that serves as the one or more obscured identifiers, or have other suitable indicia that appears to be semi-random or obscured to a user. Use of color or color background may also be used to defeat photocopying attacks. It will be recognized that portions of or all functions of the translucent identification member issuer may be provided through a distribution of providers and networks or through a web based service. For example, a recipient may access a TIDM issuance service through a web connection and locally print the TIDM or receive the TIDM through the mail. Also, identifiers can be provided by one party and sent to another party for printing or manufacturing. Other distribution of operations may also be employed as desired.

Once a visually revealed identifier is presented to a user, a user enters the visually revealed identifier through a user interface where it is compared to an expected identifier. If the entered identifier matches the expected identifier, proper authentication is indicated and a recipient may be granted access to a device, application, or process or other desired right (or submitted data is accepted—e.g. such as a vote). In addition, a list of revoked translucent identification members may also be maintained to prevent compromise due to theft or loss of translucent identification members. The list may be stored in any suitable location and updated by a service provider, translucent identification member issuer or any suitable entity. Since the translucent identification members do not require electronics to generate random numbers, the cost of such translucent identification members may be quite low and their reliability may also be relatively high since they are not susceptible to moisture or other damage typically associated with smart cards.

In an alternative embodiment, a smart card or other transaction card or non-transaction card (e.g., voting card or other suitable card) may include a translucent identification member if desired. Hence a transaction card is disclosed and includes for example a portion containing card identification information (such as a transaction card number, which may be impressed thereon such as through raised printing or electronically or through any other suitable storage mechanism such as magnetic strip or any other suitable mechanism), as well as a portion containing a translucent identification member that has a translucent area that includes one or more obscured identifiers. As such transaction cards such as credit cards, banking cards or any other transaction cards may include a window that contains the translucent identification member or may have a transaction identification number or other identification information affixed to a conventional transaction card to enhance security.

In another embodiment, the role of the translucent identification member and the recipient unit are reversed. For example, in this embodiment, the translucent identification member contains the visual filtering pattern and the display screen displays at least one obscured identifier that may be for example data representing user authentication data that is unique to a user, or other data if desired. The combination of overlaying the translucent identification member (visual filter) over the display that displays an obscured identifier, reveals (un-obscures) the at least one obscured identifier on the screen. The visual filtering pattern on the member stays the same since it is printed on the member, and the displayed obscured identifier is changed during each session or at other suitable intervals.

Accordingly, one or more of the following advantages may result. Since the translucent identification members can be printed by an organization security officer, no manufacturing costs need to be incurred and they can be generated locally for a recipient. Since there need not be electronics, there is no battery to be replaced and no damage from exposure to moisture need occur. No network or radio connectivity is required such as typically required by devices employing magnetic strips. The translucent identification member may be made of plastic or any other suitable material and in any suitable thickness. They are durable and easy to replace in the event of a compromise since they may be produced locally to an organization. Also investment in a substantial network infrastructure to continually generate master codes that are matched with dynamically changing codes on a screen and a smart card can be avoided.

Figure 1:
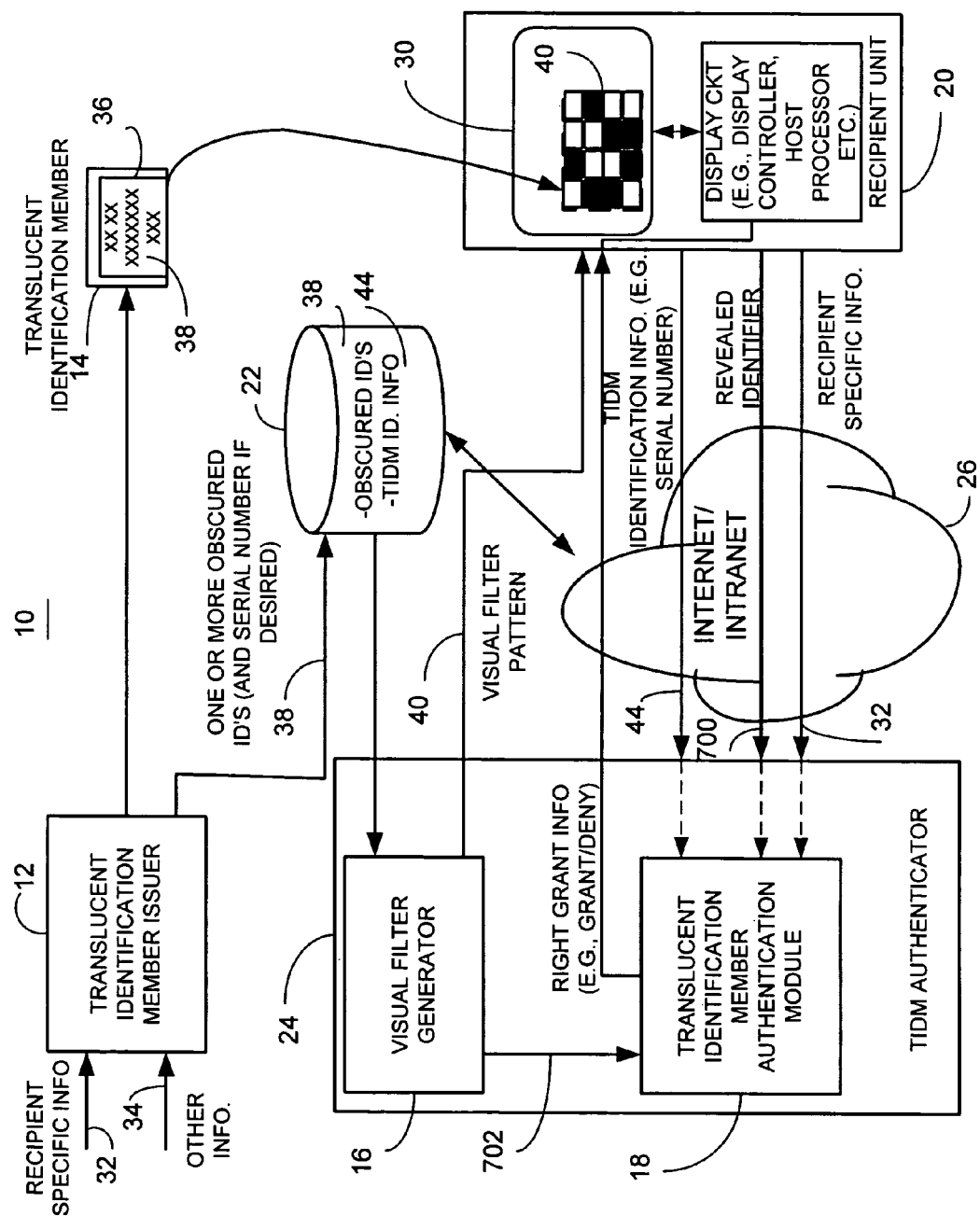
FIG. 1 is a block diagram illustrating one example of a system for securely providing identification information in accordance with one embodiment of the invention.

In one embodiment, the displayed visual filtering pattern selectively illuminates a portion of a translucent identification member to visually reveal one of the one or more obscured identifiers. The visual filtering pattern can be changed with each authentication session. The one or more obscured identifiers are printed indicia on a semitransparent (or transparent) card and is preferably unique within a particular domain of users. The one or more obscured identifiers are visually obscured through many suitable techniques such as color shading, ordering of the characters, a combination thereof or any other suitable visual obfuscation technique. FIG. 1 illustrates one example of a system 10 for securely providing identification information that includes a translucent identification member issuer 12 operative to generate a secure identification member such as translucent identification member 14, a visual filter generator 16, a translucent identification member authentication module 18, a recipient unit 20 and memory 22. In this example, the visual filter generator 16 and translucent identification member authentication module 18 are included as part of a translucent identification member authenticator 24 that may be implemented as one or more software modules executing on a computing unit such as a personal computer, work station, server, hand held device, or any other suitable device or multiple networked devices. The translucent identification member authenticator 24 is operatively coupled, in this example, to a web server which in turn is operatively coupled to a network such as the Internet 26 to facilitate web based communication between a recipient unit 20 and a translucent identification member authenticator 24. As such multiple circuits are formed by the software and processing device(s). Also, as used herein, circuits also refers to any suitable electronic logic in any suitable form including but not limited to hardware (microprocessors, discrete logic, state machines, digital signal processor etc.), software, firmware or any suitable combination thereof.

The translucent identification member issuer 12, the visual filter generator 16, and the translucent identification member authentication module 18 may be implemented in any suitable manner and is preferably, but not limited to, software modules executing on one or more computing devices that contain one or more processing devices that execute instructions that are stored in memory.

In this example, the translucent identification member issuer 12 will be described as a local server that generates the translucent identification member 14 using a printer or other suitable mechanism to generate a translucent identification member 14. The translucent identification member includes a translucent area that includes one or more obscured identifiers thereon. However, it will be recognized that the translucent identification member issuer 12 may be included as part of the translucent identification member authenticator 24, or may be located on any other suitable device including a web server and it will be recognized that any of the software programs described herein may be suitably located on any suitable device or devices as well.

The memory 22 may be any suitable local or distributed memory and may be located on a web server or locally if desired. The memory may be RAM, ROM or any suitable memory technology. The recipient unit 20 may be any suitable device such as a laptop computer, desktop computer, hand held device or any other suitable device that includes a display 30 and user interface, and may include one or more processing devices that execute instructions stored in any suitable memory. The recipient device includes the requisite circuitry to provide one or more user interfaces such as graphic user interfaces through web browsers or other applications or operating systems and may include speech recognition interfaces or any suitable user input interfaces. As such the units include a display circuit operative to display a visual filtering pattern defined such that when the visual filtering pattern is visually combined with one or more obscured identifiers located on a translucent identification member, a designated one of the one or more identifiers is visually revealed; and an input interface operative to receive data representing the visually revealed identifier. In one example, a user interface is used to request entry of a serial number associated with the translucent identification member; and request entry of the revealed identifier to determine whether to grant a desired right for the recipient.

Also if desired, a receiver unit can receive the filter or obscured identifiers for display on a display screen and send the response back through a completely different device (or through a completely different channel) such as a cell phone, by SMS message, email message or other suitable channel and/or device.

Referring also to FIGS. 2 and 3, a method for securely providing identification information will be described. As shown in block 200, a recipient sends a request into the translucent identification member issuer 12 through the Internet or through any other suitable mechanism to request issuance of a translucent identification member 14. This may be done for example by a recipient registering with an online financial institution with user-supplied data such as a password or other secret information. This is shown as recipient specific information 32 that is received by the translucent identification member issuer 12.

As shown in block 202, the method includes generating one or more obscured identifiers for a recipient, which may be based on, for example, the recipient specific information 32 and/or other information 34. The other information 34 may be a translucent identification member serial number or other suitable information if desired. This may be done for example by the translucent identification member issuer 12, or any other suitable entity. As shown in block 204, the method includes generating the translucent identification member 14 that has a translucent area 36 that includes one or more obscured identifiers 38. The one or more obscured identifiers 38 are generated by the translucent identification member issuer 12 in this example and stored in memory 22 in a database form. The one or more obscured identifiers are stored in memory 22 so that they may be subsequently accessed when it becomes necessary to create appropriate visual patterns 40 to reveal the desired revealed identifier 700 or when checking the returned revealed identifier 700.

Figure 4:
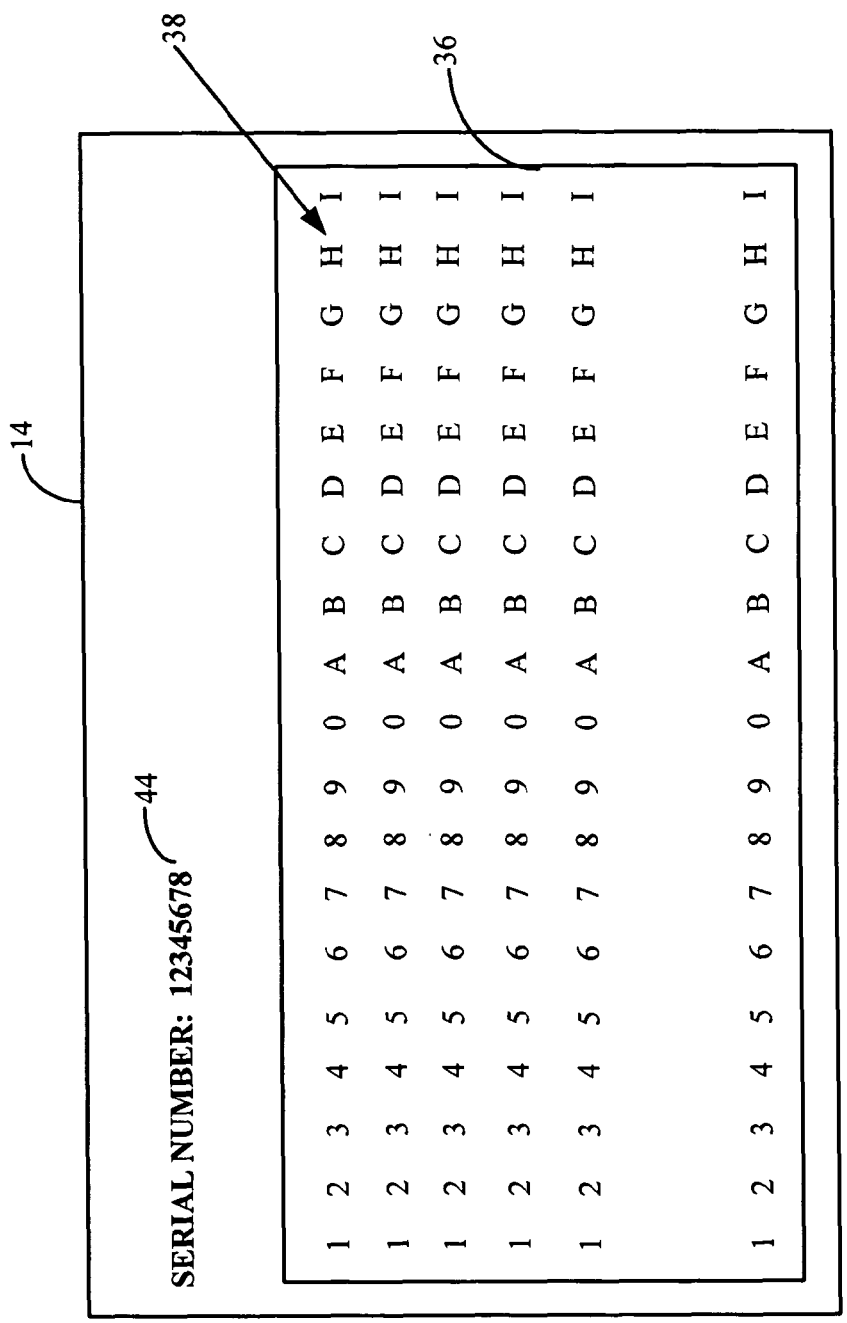
FIG. 4 is a diagram illustrating one example of a secure identification information member in accordance with one embodiment of the invention.

For example, the translucent identification member issuer 12 may control a printer to print a cellophane card as a translucent identification member 14 that has printed thereon one or more obscured identifiers. One example of a translucent identification member is shown in FIG. 4. The translucent identification member 14 can be made of any suitable material such as plastic or any other suitable material that provides some level of transparency so that a combination of the one or more obscured identifiers when overlayed on a display that emits light, allows the light energy (or lack of light energy) from the display to combine with the one or more obscured identifiers to visually designate one of the one or more identifiers on a translucent identification member. The one or more identifiers on a translucent identification member may also be a plurality of different obscured identifiers.

The translucent identification member 14 may be a card, sheet, film or other member that may include if desired any suitable adhesive or connecting structure to be applied over a window of transaction card, or any other suitable material. The translucent identification member may also be connected to a transaction card, such as, for example, by using a suitable connecting structure to join the translucent identification member to an end or side of a transaction card. The one or more obscured identifiers 38 that are printed on the translucent identification member 38, as noted above, may be characters (e.g., ASCII), symbols, print patterns, colored versions thereof or any other suitable indicia. The one or more obscured identifiers 38 appear to be visually obscured and hence seemingly random when viewed by a recipient. In other embodiments it may be desirable to print patterns of ink that do not connote characters but instead visually conceal a message or other information so that when overlayed on top of a display the pattern generated by the display in combination with the printed image, allows the viewer to visually decipher a revealed identifier.

The translucent area 36 includes an information pattern that represents one or more identifiers that may be unique identification information that may be used for one or more authentication sessions or other purposes. The information pattern represented by one or more obscured identifiers is preferably unique to a given domain of users to reduce the likelihood of the same user obtaining a same translucent identification member with the same obscured identifiers. The translucent area 36 is configured (e.g. sized) to overlay at least a portion of the display screen 30 on the recipient unit 20. In one embodiment, each of the one or more obscured identifiers may serve as one-time authentication identifiers for the recipient of the translucent identification member. It is noted, as used herein, identification information includes any information used to directly or indirectly authenticate a user (e.g., TIDM recipient) or other process of interest, or to get access to a desired right associated with a process or device, or any other suitable information that is intended to be kept secret except at the time a transaction is to be effected.

To make the TIDM, the method may include receiving a request from a user for one or more obscured user identifiers and recording a link between the user and the identification information associated with the one or more obscured user identifiers. The method may include providing the one or more obscured user identifiers to the user wherein the one or more obscured user identifiers are on a translucent identification member that is sent to the user, the one or more obscured user identifiers are sent to a third party to be placed on a translucent identification member for the user, the one or more obscured user identifiers are sent to the user for placement on a translucent identification member, and the one or more obscured user identifiers are selected from a pre-existing pool of obscured user identifiers. The request from the user may include user specific information and the user specific information may be used to create the one or more obscured user identifiers or may be combined with other information to produce the one or more obscured user identifiers.

As shown in block 206, once the translucent identification member 14 has been generated and provided to a recipient, the visual filtering generator 16, or other suitable mechanism generates a visual filtering pattern for display on the display 30 of the recipient device. When the visual filtering pattern 40 is displayed by the recipient device, the visual filtering pattern visually combines with the one or more obscured identifiers located on the translucent identification member 14, to designate one of the one or more identifiers. In other words, the visual filtering pattern filters out undesired identifiers to reveal a selected one of the one or more identifiers.

As shown in block 208, the method may include overlaying, such as by a recipient, or a device, the translucent identification member 14 on the displayed filtering pattern 40 to visually identify a designated one of the obscured identifiers on the translucent identification member 14. The visually identified identifier is then entered by the recipient to facilitate a transaction or gain access to a specific desired right associated with any process or device of interest.

As shown again in FIG. 3, the steps of FIG. 2 are presented in more detail. As shown in block 300, generating one or more obscured identifiers for a recipient may be done for example by the translucent identification number issuer 12 or any other suitable entity by obtaining recipient specific information, such as secret or non-secret data or non-user related information. This process may also be accomplished by using non user-related and non user-supplied material, in which case, the generated one or more obscured identifiers are subsequently associated with a user. When recipient specific information is used, this may be a personal identification number, password, user name, account number or other data provided by the recipient through the recipient unit 20 or from any other suitable source. This is indicated as recipient specific information 32. As shown in block 302 the recipient specific information 32 is suitably combined, such as through a suitable mathematical function or algorithm, to produce the one or more obscured identifiers 38. The other information 34 may be, for example, output generated from a random number generator, the actual translucent identification member serial number 44 (or other TIDM identification information) that may be printed on the translucent identification member 14 or stored by the translucent identification member issuer 12, or any other suitable information. As shown in block 204, a translucent identification member serial number, or any other suitable information for identifying the translucent identification member, is assigned to the obscured one or more identifiers 38. It will be recognized that upon an initial request or generation of a translucent identification member that the translucent identification member issuer 12 may select a translucent identification member serial number and associate therewith the recipient specific information 32. This information may be combined to generate the one or more obscured identifiers 38. The translucent identification member serial number 44 may be stored in memory 22 for later use by the translucent identification member authenticator 24 (authenticating a recipient using the translucent identification member 14). The order of the steps as described herein with respect to any method may be suitably reordered based on a desired result.

As shown in block 306, generating the translucent identification member 14 may include printing the obscured different identifiers in a desired format on a plastic film, sheet or card to produce the translucent identification member 14. As shown in block 308, displaying the filtering pattern 40 on a display may include randomly selecting, from the obscured identifiers, a selected identifier to produce a visual filtering pattern 40 on display 30 that reveals the selected one of the obscured identifiers as the identifier to be revealed when the translucent identification member 14 is overlayed on the visual filtering pattern 40.

As shown in FIGS. 4 through 7, and to further illustrate an example, as shown in FIG. 4, the translucent identification member 14 has printed thereon the translucent identification member serial number 44 or other identification information and the one or more obscured identifiers 38 printed in the translucent area 36. As noted above this may be printed on cellophane material or other material readily accommodated by conventional printers, if desired, to reduce fabrication costs. However any suitable material or manufacturing process may be used. Once the recipient is in possession of the translucent identification member 14, multi-factor authentication is provided using the translucent identification member 14.

The filter may be generated in any suitable way. For example, a selected obscured identifier may be chosen from the stored one or more obscured identifiers whose position on the TIDM is defined. The visual filter pattern generator 16 produces a filtering pattern based on a predefined layout of the TIDM to insure that the filter blocks the proper character locations. Any other suitable technique may also be used.

Figure 5:
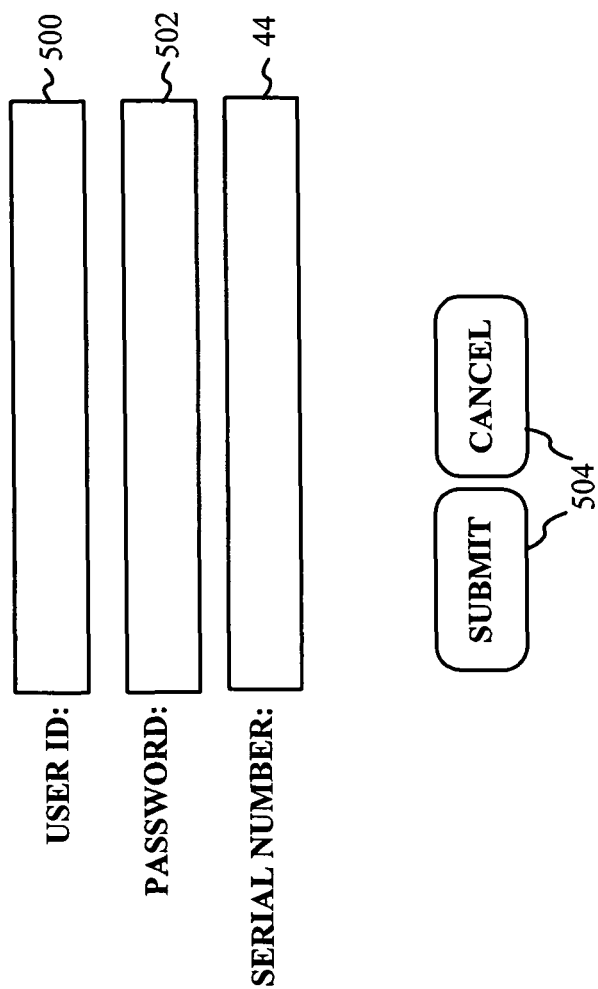
FIG. 5 is a diagram graphically illustrating one example of a login screen to facilitate authentication of a user or for securely providing identification information in accordance with one embodiment of the invention.

As shown in FIG. 5, the recipient device 20 may display, through a web browser or other suitable user interface, an input screen, based on a received HTML page if a web browser is being used, containing fields that receive user input such as a user identifier field 500, a password field 502 and the translucent identification member serial number field 44. The user submits the entered information through suitable interface buttons 504. This information is then sent to the web server via the Internet and if desired forwarded to the translucent identification member authenticator 24. As shown in this example the information entered in user ID field 500 or the password field 502 may be considered recipient specific information 32 that was previously entered when the translucent identification member issuer 12 initially generated the translucent identification member 14.

FIG. 6 illustrates one example of a graphic user interface (generated based on a received HTML page) displayed on display 30 to facilitate securely providing identification information using the translucent identification member 14. The graphic user interface may be generated for example through a web browser and suitable host processor on the recipient unit or any other suitable processor, and indicates an overlay area 600 that may be the same size or a different size than a visual filtering pattern 40 that is presented on the display 30. Hence in response to the login screen shown in FIG. 5, the translucent identification member authenticator 24 submits a response containing the visual filtering pattern 40 and the response interface screen shown in FIG. 6. The recipient unit 20 displays the visual filtering pattern 40 and a revealed identifier field 602 to allow entry of the one revealed ID from the one or more obscured identifiers.

FIG. 7 graphically illustrates the condition where the translucent identification member 14 is overlayed on top of the visual filtering pattern 40 to reveal one of the one or more obscured identifiers. The user positions the translucent identification member 14 and hence the one or more printed obscured identifiers 38 over the visual filtering pattern 40 and the combination of the visual filtering pattern 40 and the printed different obscured identifiers 38 reveals in this example a revealed identifier 700 which is then entered by the recipient in the revealed identifier field 602. The user then submits the revealed identifier 700 to the translucent identification member authenticator 24 to authenticate the user for the particular transaction or for access to a particular right. Accordingly, the translucent identification member authenticator 24 receives data representing the revealed identifier 700 in response to a user or other entity overlaying the translucent identification member 14 on the display 30. The translucent identification member authentication module 18 compares the received revealed identifier 700 with a corresponding expected identifier 702 (see FIG. 1) to determine whether proper authentication of the recipient is appropriate. The translucent identification member authentication module 18 obtains the corresponding expected identifier 702 from the memory 22 or may generate the expected identifier on the fly knowing the visual filter pattern and accessing the obscured identifiers 38, or may obtain the expected identifier 702 in any other suitable manner.

Referring to FIGS. 8 and 9 the issuance of a translucent identification member 14 will be described in more detail by way of an exemplary embodiment. In order to obtain a translucent identification member 14, a recipient registers with an online bank or other institution using recipient specific information 32 such as an account number or other information as indicated by registration request 800. This request is then passed through to a web server 802. The web server 802 then communicates with a bank server 804 which includes for example a customer management system and translucent identification member requester 806 which may be a suitable software application executing on a processing device if desired or any other suitable structure. The bank server 804 then generates a translucent identification member issuance request 808 to the translucent identification member issuer 12 which may be included in or separate from a suitable server 810. The translucent identification member issuance request 808 includes the recipient specific information 32 entered by the user. In response, the translucent identification member issuer 12 provides the obscured identifiers 38 in a response message 810 and generates and records a translucent identification member serial number 44 in the memory 22 along with the associated obscured identifiers 38 that will appear on the translucent ID member 14 for the requesting recipient. In this example, the bank server 804 links the recipient's account with the translucent identification member serial number 44 and then stores the linked information in a database 810 for later use. The bank server 804 then generates the translucent identification member 14 by, for example, formatting the obscured identifiers 38 for printing and sending the information to a printer 814 or other device which then prints out or manufactures the translucent identification member 14. Hence the translucent identification member serial number 44 is assigned by the translucent identification member issuer 12 and is associated (e.g., linked) with the one or more obscured identifiers 38 and with the user in memory 22 in a database.

The translucent identification member issuer 12 may include an information randomizer 900 and a translucent identification member formatter 902. The information randomizer 900 may use the translucent identification member serial number 44 as other information 34 to be combined with the recipient specific information 32 to generate the one or more obscured identifiers 38. This may be done using a hash algorithm or other suitable encoding technique as desired to generate the one or more obscured identifiers 38. The translucent identification member formatter 902 may be another software application executing on a suitable processing device or devices that formats the information for output to a printer or other manufacturing device.

FIGS. 10 and 11 illustrate another embodiment of the operation of the system after the issuance of the translucent identification member has occurred. As shown in block 1000, the method includes requesting and obtaining recipient specific information 32 such as previously described with reference to FIG. 5. Once the translucent identification member 14 has been printed or manufactured, it is then provided to the recipient by hand or through mail or any other suitable technique as shown in block 1002. As shown in block 1004, a bank server of a bank determines if a recipient has requested authentication, such as to a logon request. If a request has been received, a web page may be sent requesting entry of the recipient information 32 including the password and the translucent identification member serial number 44 as a first level of a multi-factor authentication process as shown in block 1006. This may be done for example through the screen shown in FIG. 5. As shown in block 206, the bank server determines whether the entered recipient specific information 32 and password and translucent identification member serial number 44 are correct for example by passing along the information to the translucent identification member authenticator 24. If the first authentication level passes, the method includes, as shown in block 1010, displaying the visual filtering pattern 44 that when visually combined with the one or more obscured identifiers 38 on the translucent identification member 14, reveals only one of the one or more obscured identifiers as the appropriate identifier to be entered for the current session or transaction. The bank server may then, through the web server, request entry of the revealed identifier 700 as selectively revealed through the filtering pattern displayed on the display by providing the screen as shown in FIG. 6. This is shown in block 1010. In response to the request, the translucent identification member authenticator 24 receives the revealed one time use identifier 700 and compares the received identifier to a corresponding expected ID determined for example by the visual filter generator or authenticator 24. This is shown in block 1012. Given the "filter", the user's data entry and stored information about that user, the authenticator can validate whether the user entered correct data or not (either on its own or by passing it to a "server"). If the desired identifier is generated before requesting it from the user, the system also generates the right filter to reveal the pre-determined identifier (all before presenting to the user). Alternatively, if the user is provided with a pattern (the filter) and then the system validates the identifier that the user entered with the identifier that would have resulted from that pattern, a desired identifier need not be picked ahead of time and the "filter generator", therefore does not require knowledge of anything else. The data representing the visually revealed identifier (e.g., the date itself, an encrypted form thereof or other suitable data, may also be received using a device other than the device on which the visual filtering pattern is displayed. For example, the identifier may be revealed on a screen of one device and a handheld device or non-handheld device may be used to enter and send the visually revealed identifier to another device or system that checks whether there is a match.

As shown in block 1014 if a match does not exist, the recipient will be sent an error and requested to re-enter the revealed identifier. The system may change to using a different identifier for the re-try. Also, the system may lockout the user after a certain number of failed attempts. However, as shown in block 1016, if a match occurs, second factor authentication is determined to be successful and the user is granted the desired right.

FIG. 12 and FIG. 13 illustrate examples of transaction cards that employ translucent identification members 14 (including the type shown in FIG. 14). The transaction cards may be smart cards or non-smart cards and have the conventional information associated with credit cards, debit cards, or any other suitable transaction cards and in addition include the translucent identification member 14. The translucent identification member 14 appears on a portion of the transaction card. One portion of the transaction card includes account information such as an account number, credit card number, or any other suitable identifier 1300 and if desired, other user identifiers such as a user name 1402. In an example shown in FIG. 12, the transaction card includes an opening 1306 that may be, for example, cut in the plastic transaction card or otherwise provided in the plastic card and a translucent identification member 14 with adhesive may be placed over the opening or may be integrally molded therein or otherwise attached such as but not limited to a connecting structure configured to receive and hold the TIDM in or to the transaction card so that the size of the transaction card is the same size as conventional transaction cards or any other suitable size as desired. If used, the connecting structure may be a snap fit structure, slide in structure, adhesive based connection or any suitable connecting structure as desired.

FIG. 13 illustrates a different example in which the translucent identification member 14 is attached to a side surface or any other surface of a conventional transaction card. The translucent identification member 14 may be foldable along a fold line 1400 or may be of a thickness wherein it is non-foldable and formed as part of the transaction card if desired. Any other suitable mechanisms for suitably attaching the translucent identification member with or to a transaction card is also contemplated.

FIGS. 14 and 15 illustrate an alternative embodiment that basically reverses the role of the translucent identification member and the recipient unit. In this embodiment, the translucent identifier 14 contains the visual filtering or enhancement pattern 40 and the display screen displays at least one obscured identifier that may be for example data representing user authentication data that is unique to a user or non-unique to a user as desired (see FIG. 15). As with the previous embodiment, the combination of overlaying the translucent identification member (visual filter) over the display that displays an obscured identifier, reveals (un-obscures) or enhances the at least one obscured identifier on the screen. The revealed user authentication data may then be entered into a suitable transaction device as the password or other user authentication information. Also, when the translucent area is attached or incorporated in a conventional transaction card, the transaction card includes as shown for example on FIGS. 12 and 13, a first portion containing a transaction card number and a second portion containing a translucent identification number or other identifying information having a translucent area that includes a visual filtering pattern.

FIG. 16 illustrates one example of a system 1600 employing the TIDM 14 of FIG. 14. In this example, the TIDM authenticator 24 includes an obscured identifier generator 1602 similar to the type used to generate the one or more identifiers described with reference to FIG. 1. The obscured identifier generator 1602 generates the obscured identifier(s) after receiving recipient specific information from a user, such as a user name, TIDM serial number, or other suitable information, to insure that the proper obscured identifier is displayed for that user. As part of the registration process, the user may have already provided the same user specific information and the obscured identifier generator 1602 may have already generated the obscured identifier and stored them in memory 22.

The translucent identification member issuer 12, in this example generates a TIDM 14 having a translucent area having a visual filtering pattern 40 thereon configured to visually filter a displayed obscured user identifier(s) 38 and is configured to overlay at least a portion of a display screen. Having a user enter in user specific information to initiate a session may be desirable where the same filtering pattern is printed on translucent identifier members for a plurality of users. It is desirable to know that the holder of the TIDM is a proper user as opposed to a thief that stole the TIDM. The authenticator, or other source, sends the generated obscured identifier to the recipient device. The recipient device displays the at least one visually obscured identifier as user authentication data and receives data representing the revealed user authentication data (such as the revealed ID itself or a representation of it) based on the translucent identification member having a filtering pattern thereon. For example when the translucent identification member having the filtering pattern thereon is held over the display, the filter reveals the user identifier. If desired, a translucent identifier serial number can be assigned to each TIDM even though the same filter pattern may be printed on more than one TIDM. As such, several users may have translucent identification members with the same filter pattern.

The translucent identification member issuer 12 is operative to generate a translucent identification member 14 having a translucent area that includes a visual filtering pattern 40 thereon configured to visually filter a displayed obscured user identifier and configured to overlay at least a portion of a display screen. The obscured identifier generator 1602 generates at least one visually obscured identifier for display on a display, in response to received user information such as user specific information. The translucent identification member authenticator 18, in this example receives data representing the revealed identifier such as through the user entering the information through a user interface after the filtering pattern is overlayed on the display and as previously described, the translucent identification member authenticator compares the received revealed identifier with a corresponding expected identifier (since it was generated by the obscured identifier generator) to determine whether proper authentication of a recipient is appropriate. Alternatively, the translucent identification member authenticator may send the received revealed identifier to a third party that carries out the comparison and sends a message back to the authenticator or recipient unit. Any other suitable division of operations may also be used as desired. The translucent identification member authenticator or third party then sends right-grant information to a recipient unit in response to the received data matching the corresponding expected identifier.

FIG. 17 illustrates one example of a method for securely providing identification information that includes generating at least one obscured identifier for a recipient based on, for example, received recipient secret data or non-secret data or data that is not related to or received from the recipient. This is shown in block 1700. As shown in block 1702, the method includes generating a translucent identification member 14 having a visual filtering pattern 40 thereon. After the TIDM has been made, the method includes receiving user identification information, such as a PIN: or other data as a first factor of authentication for the user. As shown in block 1704, the method includes sending the one or more obscured identifiers to the recipient and displaying at least one visually obscured identifier as second factor user authentication data, that when visually combined with the visual filtering pattern 40 on the translucent identification member, reveals an obscured identifier for a user. As shown in block 1706, the method includes, the user for example, overlaying the translucent identification member on the display to visually identify the obscured identifier through the filter. The method also includes receiving data representing the revealed user authentication data based on the translucent identification member having a filtering pattern thereon. The method also includes receiving user specific information, such as prior to the step of displaying the obscured identifier, to determine the visually obscured identifier to be displayed on the display. For example, the system needs to determine which obscured identifier to display since each user preferably has a different identifier. This may be determined for example by having the user enter user specific information, through a user interface in the recipient unit, such as a password or other secret or non-secret information as desired.

Stated another way, the method includes receiving user identification information as a first factor of authentication for a user and using, such as by the TIDM authenticator, service provider or other suitable entity, such user identification information to identify a translucent identification member in memory containing a particular visual filtering pattern known to have been associated with such user. The method includes generating an expected identifier to be used as a second factor of authentication for the user associated with the received user identification information and generating a pattern of obscured user identifiers containing the expected identifier such that when the pattern of obscured user identifiers is combined with the visual filtering pattern on the identified translucent identification member associated with the user the expected identifier will be revealed. The method includes transmitting the pattern of obscured user identifiers to a display (e.g., a displayed GUI) and requesting entry of a revealed identifier; and receiving data representing the revealed identifier. As noted above, the TIDM authenticator for example, or any suitable number of servers, or devices act as the circuits to carry out the above operations.

The primary functionality of the disclosed apparatus, methods and systems may be provided through application programming interfaces (APIs) that are executed by one or more processing devices that can be readily integrated into current infrastructures. In addition, each translucent identification member in one embodiment is different and has seemingly different random information since the seemingly random information is typically, but not necessarily, generated from information unique to a recipient, such as a password, user name, personal identification number, or any other information. In each embodiment, translucent identification members, and/or visual filters and/or obscured identifiers can be pre-manufactured and subsequently associated with a user. Additionally, the obscured identifiers and/or filtering patterns can be pre-generated and subsequently applied to translucent identification members. Such subsequent application to translucent identification members may be done by the creator of the filtering patterns or obscured identifiers or may be done by the entity providing the service or by a third-party contractor of the service provider. Since the manufacture of translucent identification members can be done with very simple materials such as transparent plastic, it is also possible for the service provider to send the obscured identifiers or visual patterns to user who can then themselves, apply the filtering pattern or obscured identifiers to a translucent identification member.

The same translucent identification member may be used a repeated number of times since there may be a plurality of different obscured identifiers thereon wherein each time authentication is requested a different one of the obscured identifiers is exposed through the visual filtering pattern. Hence the visually revealed identifier on the translucent identification member can change during each authentication session if desired. The translucent identification members described herein may be used for user authentication, activating software applications or for any other suitable purpose. The different obscured identifiers may be characters, images, or any other suitable information.

The above detailed description of the invention and the examples described therein have been presented for the purposes of illustration and description and that other variations will be recognized by those in the art. For example, it will be recognized that the various operations described herein may be distributed in a network or non-network configuration. For example, different operations of the authenticator or TIDM issuers or other operations may be performed by one or more third party web server(s) or other entities or devices. It is therefore contemplated that the present invention cover any and all modifications, variations or equivalents that fall within the spirit and scope of the basic underlying principles disclosed above and claimed herein.

What is claimed is:

1. A method for making a secure identification information member for a user comprising:
generating a plurality of obscured user identifiers;
generating a translucent identification member having a translucent area that includes the a plurality of obscured user identifiers, the translucent identification member without a corresponding filtering pattern thereon;
assigning identification information to the plurality of obscured user identifiers;
storing the identification information and associated plurality of obscured user identifiers; and
providing the identification information on the translucent identification member at a different location from the plurality of obscured identifiers.

2. The method of claim 1 wherein generating the one or more obscured user identifiers includes:
obtaining user specific information associated with the user; and
combining the user specific information with other information to produce the one or more obscured user identifiers.

3. The method of claim 1 wherein generating the one or more obscured user identifiers includes:
obtaining user specific information associated with the user; and
using the user specific information to produce the one or more obscured user identifiers.

4. The method of claim 1 wherein generating the plurality of obscured user identifiers includes:
generating the one or more obscured user using the assigned identification information.

5. An apparatus for creating an apparatus for securely providing identification information comprising: one or more processor and memory coupled to the one or more processor; the one or more processors to generate one or more obscured user identifiers; and a translucent identification member former in communication with the one or more processors operative to generate a translucent identification member having a translucent area that includes the one or more obscured user identifiers, the translucent identification member without a corresponding filtering pattern thereon; and wherein the one or more processors is operative to assign identification information to the one or more obscured user identifiers; store the identification information and associated one or more obscured user identifiers; and provide the identification information for placement on the translucent identification member.

6. The apparatus of claim 5 wherein the one or more hardware processors is operative to obtain user specific information associated with a user; and combine the user specific information with other information to produce the one or more obscured user identifiers.

7. The apparatus of claim 5 wherein the one or more hardware processors is operative to obtain user specific information associated with a user and use the user specific information to produce the one or more obscured user identifiers.

8. The apparatus of claim 5 wherein the one or more hardware processors is operative to generate the one or more obscured user identifiers using the assigned ID information.

9. A method for securely providing identification information comprising:
sending a visual filtering pattern to a display device wherein the filtering pattern is defined such that when the visual filtering pattern is visually combined with one or more obscured user identifiers located on a translucent identification member sized to cover a portion of a display, a designated one of the one or more identifiers is visually revealed; and
receiving data representing the visually revealed identifier.

10. The method of claim 9 including sending the received data representing the visually revealed identifier to an authentication apparatus.

11. The method of claim 9 wherein the data representing the visually revealed identifier is received using a device other than the device on which the visual filtering pattern is displayed.

12. A method for securely providing identification information comprising:
receiving user identification information;
using the user identification information to identify a translucent identification member sized to be smaller than a display that comprises a plurality of obscured user identifiers known to have been associated with such user;
selecting from the plurality of obscured user identifiers a particular obscured user identifier to be used as a second factor of authentication for the user associated with the received user identification information;
generating a visual filtering pattern that when combined with the one more obscured user identifiers on the identified translucent identification member will reveal the selected particular obscured user identifier from among the obscured user identifiers;
transmitting the visual filtering pattern and requesting entry of the revealed identifier; and
receiving data representing the revealed identifier.

13. The method of claim 12 including examining the received data representing the visually revealed identifier to determine if it matches an expected value.

14. The method of claim 13 wherein the expected value has been determined before receipt of the received data representing the visually revealed identifier.

15. The method of claim 13 wherein the expected value is determined after receipt of the received data representing the visually revealed identifier.

16. The method of claim 13 including granting a right to the user if the received data representing the visually revealed identifier matches the expected value.

17. The method of claim 13 including sending the received data representing the visually revealed identifier to an authentication apparatus.

18. The method of claim 17 including receiving a reply from the authentication apparatus and granting a right to the user if the authentication apparatus indicates that a match with the expected value occurred.

19. The method of claim 13 wherein the step of using the user identification information includes checking if the translucent identification member is valid based on a list of invalid translucent identification members.

20. A method for associating secure identification information with a user comprising:
receiving a request from a user for one or more obscured user identifiers;

recording a link between the user and identification information associated with the one or more obscured user identifiers; and wherein the one or more obscured user identifiers are on a translucent identification member, sized to be smaller than a display, that is sent to the user wherein the request from the user includes user specific information and wherein the user specific information is combined with other information to produce the one or more obscured user identifiers.

21. The method of claim 20 including:
providing the one or more obscured user identifiers to the user.

22. The method of claim 21 wherein the one or more obscured user identifiers are sent to a third party to be placed on a translucent identification member for the user.

23. The method of claim 21 wherein the one or more obscured user identifiers are sent to the user for placement on a translucent identification member.

24. The method of claim 20 wherein the one or more obscured user identifiers are selected from a pre-existing pool of obscured user identifiers.

25. A system for securely providing identification information comprising:
a circuit operative to receive user identification information;
a circuit operative to use such user identification information to identify a translucent identification member and one or more obscured user identifiers known to have been associated with such user; and for selecting from the one or more obscured user identifiers a particular obscured user identifier to be used as a second factor of authentication for the user associated with the received user identification information;
a circuit for generating a visual filtering pattern that when combined with the one more obscured user identifiers on the identified translucent identification member will reveal an expected revealed identifier from among the obscured user identifiers;
a circuit for transmitting the visual filtering pattern and for requesting entry of a revealed identifier; and
a circuit for receiving data representing the revealed identifier.

26. The system of claim 25 including a circuit to examine the received data representing the revealed identifier to determine if it matches the expected revealed identifier.

27. The system of claim 26 wherein the circuit for examining the received data can determine the expected revealed identifier prior to the receipt of the received data representing the revealed identifier.

28. The system of claim 26 wherein the circuit for examining the received data can determine the expected revealed identifier after the receipt of the received data representing the revealed identifier.

29. The system of claim 26 including a circuit to grant a right to the user if the received data representing the revealed identifier matches the expected revealed identifier.

30. The system of claim 26 wherein the circuit for examining the received data representing the revealed identifier does so by sending the received data to an authentication device.

31. The system of claim 30 including a circuit for receiving a reply from the authentication device and for granting a right to the user if the authentication device indicates that a match with the expected revealed identifier occurred.

32. An apparatus for creating an apparatus for securely providing identification information comprising: one or more processor and memory coupled to the one or more processor; a translucent identification member authenticator, comprising the one or more processors, operative to receive user data representing a revealed identifier in response to overlaying a translucent identification member with obscured user identifiers thereon sized to be smaller than a display on a display; and operative to compare the received data with corresponding expected revealed identifier to determine whether proper authentication of the user is appropriate.

33. The apparatus of claim 32 wherein the translucent identification member authenticator determines the expected revealed identifier prior to the receipt of the received data corresponding to the revealed identifier.

34. The apparatus of claim 32 wherein the translucent identification member authenticator determines the expected revealed identifier after the receipt of the received data corresponding to the revealed identifier.

35. An apparatus for associating secure identification information with a user comprising:
a circuit operative to receive a request from a user for one or more obscured identifiers on a translucent identification member sized to be smaller than a display; and
the circuit operative to record a link between the user and the identification information associated with the one or more obscured user identifiers.

36. The apparatus of claim 35 wherein the circuit is operative to select the one or more obscured user identifiers are selected from a pre-existing pool of one or more obscured user identifiers.

37. The apparatus of claim 35 wherein the circuit is operative to request information from the user that includes user specific information and wherein the user specific information is combined with other information to produce the one or more obscured user identifiers.

38. The apparatus of claim 35 wherein the circuit is operative to request information from the user that includes user specific information and wherein the user specific information is used to produce the one or more obscured user identifiers.

39. An apparatus for securely providing identification information comprising: one or more processor and memory coupled to the one or more processor; a visual filtering pattern generator comprising the one or more processor operative to generate a visual filtering pattern based on data identifying a translucent identification member sized to the smaller than a display that has a translucent area that includes one or more obscured user identifiers such that when the visual filtering pattern is visually combined with the one or more obscured user identifiers on the translucent identification member, a designated one of the one or more obscured user identifiers is revealed.

40. The apparatus of claim 39 including a translucent identification member authenticator operative to receive data representing the revealed identifier in response to overlaying the translucent identification member with one or more obscured user identifiers on a display; and to compare the received data with a corresponding expected identifier to determine whether proper authentication of the recipient is appropriate.

41. A method for securely providing identification information comprising:
displaying a visual filtering pattern defined such that when the visual filtering pattern is combined with one or more obscured user identifiers located on a translucent identification member sized to be smaller than a display, a designated one of the one or more visual identifiers is revealed; and receiving input data representing the visually revealed identifier.

42. The method of claim 41 wherein displaying the visual filtering pattern includes indicating an overlay area on the display for overlaying the translucent identification member.

43. The method of claim 42 including the step of transmitting the received input data representing the visually revealed identifier.

44. The method of claim 41 wherein the received input data is received on a device other than the device that is used to display the visual filtering pattern.

* * * * *